INVENTORS
JAMES B. GRANT
HAROLD S. HENDRICKSON
BY Feller, McCormick, Paulding & Huber
ATTORNEYS

United States Patent Office 3,217,240
Patented Nov. 9, 1965

3,217,240
MOVABLE CORE TRANSFORMER CONTROL DEVICE
James B. Grant, Windsor, and Harold S. Hendrickson, Bloomfield, Conn., assignors to Kaman Aircraft Corporation, a corporation of Connecticut
Filed June 7, 1961, Ser. No. 115,446
19 Claims. (Cl. 323—51)

This invention relates in general to electric control devices, and deals more particularly with a force rod for producing an electrical output signal related to the force applied to the rod and with displacement sensing and switching mechanisms forming a part of the force rod.

The general object of this invention is to provide a force rod adapted for use as a force or motion transmitting device in a mechanical linkage system or the like and which includes means for developing an electrical output signal related to the force applied to the rod.

Another object of this invention is to provide a force sensing device adapted for use in an electric control system and which sensing device has an improved input vs. output signal characteristic such as to prevent control point drift or other undesirable conditions in the control system.

Another object of this invention is to provide an electric control device for converting a force into an electric output directly related to the magnitude of the force and which control device includes means for positively eliminating or avoiding the production of an output signal when the force being measured is zero or relatively small. That is, this object concerns the provision of an electrical force measuring device having an output signal which is in general related to the magnitude of the force, but which output signal is zero over a predetermined dead band corresponding to small values of force.

A further object of this invention is to provide an electric switching mechanism suited for incorporation into an electric control device for providing a dead band such as mentioned in the proceeding object. In keeping with this object it is a further object to provide a switching mechanism including means for alternately operating two switches, such as microswitches, in response to movement of a movable member and further including means for mechanically amplifying the motion of the movable member to increase the sensitivity of the switches to the movement of the movable member.

Other objects and advantages of the invention will be apparent from the drawings and the following description.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Figures 1, 2:
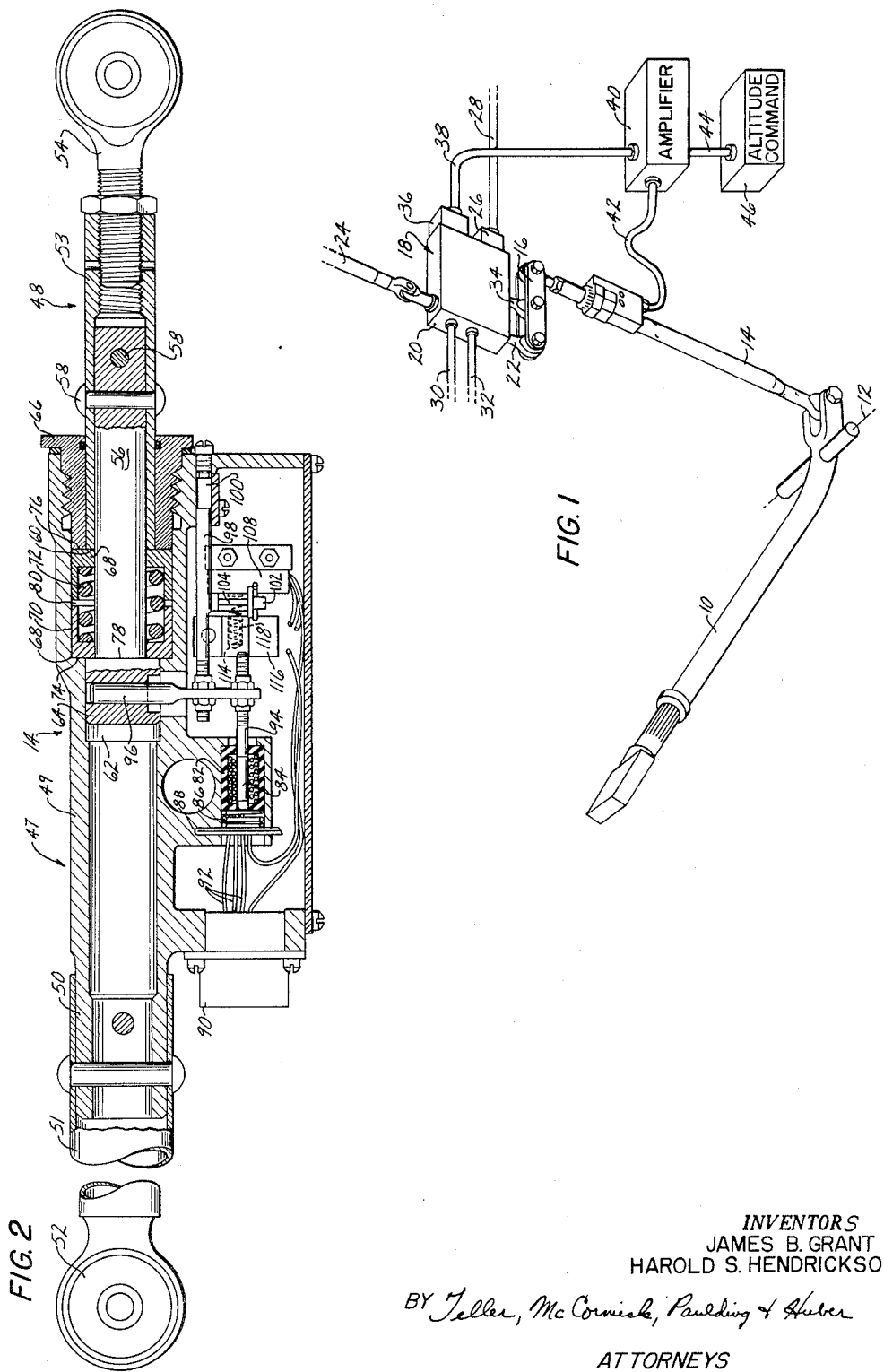
FIG. 1 is a perspective view illustrating a portion of the control system of a helicopter, and which control system includes a force rod embodying the present invention.
FIG. 2 is a generally longitudinal sectional view taken through the force rod shown in FIG. 1.

*General organization and operation of control system using force rod—FIG. 1*

The force rod of this invention, and the various electrical control components thereof, may be used in various different electric control systems requiring the development of an electric output signal directly related to a force or a mechanical displacement occurring in some portion of the system. For the purpose of illustration, the force rod of this invention is shown in FIG. 1 as incorporated into the collective rotor pitch control system of a helicopter, and will be described in connection with such a control system. It is to be understood, however, that the force rod and various other features of the invention are not necessarily limited to such a control system.

Referring to FIG. 1, the illustrated control system is adapted for either manual or automatic operation. The system includes a pilot operable collective stick 10 which is pivotally supported in the cockpit of a helicopter for movement about a pivot axis indicated at 12. The collective stick 10 extends generally forwardly, or to the left as viewed in FIG. 1, from the pivot axis 12 and is so arranged and connected with other parts of the collective pitch control system that generally upward or clockwise movement thereof results in an increase in the collective pitch of the helicopter main rotor, so as to increase the lift thereof, while a generally downward or counterclockwise movement thereof results in collectively decreasing the pitches of the rotor blades to decrease the lift thereof.

Associated with the collective stick 10 is a force rod 14 which serves to transmit movements of the stick to the input lever 16 of an hydraulic servo actuator 18, one end of the rod 14 being pivotally connected to the collective stick 10, as shown, and the other end being pivotally connected to the input lever 16.

The structure of the hydraulic servo actuator 18 by itself forms no part of the present invention. It is sufficient here to understand only the general operation of the servo actuator and for this purpose it is noted that it includes a body 20 having a power piston 22 extending therethrough with one end connected to the input lever 16 and the other end connected to a push-pull rod 24. The latter rod 24 is connected with other mechanism, not shown, for changing the collective pitch of the rotor blades in response to movement of the power piston 22. Electromechanical selector means or the like indicated at 26 is associated with the servo actuator and functions to condition the same for either manual or automatic operation in response to signals which may be supplied by an electric line 28. Hydraulic fluid is supplied to and exhausted from the actuator by the lines 30 and 32, respectively. When the selector means 26 is operated to condition the servo actuator for manual operation an electromechanical input device 36 is rendered inoperable and a power boost input rod 34 is rendered operable. When operable, the power boost input rod controls a valve means within the body 20 for hydraulically moving the power piston 22 in response to movements of the input rod. That is, movement of the collective stick 10 by the pilot is transmitted by the force rod 14 to the input lever 16 which causes a corresponding movement of the input rod 34. The movement of the input rod operates valve mechanisms within the body 20 to cause the power piston to follow the movements of the input rod. In other words, the servo actuator serves as a power boost for hydraulically moving the power piston 22 and the push-pull rod 24 in response to the manual movements of the collective stick and the force rod.

When the selector means 26 is conditioned to provide for automatic operation, the power boost input rod 34 is locked in a fixed position relative to the body 20 and rendered inoperable to hydraulically control the movement of the power piston 22. At the same time, however, the electromechanical input device 36 is rendered operable and acts in response to electric signals supplied by the line 38 to cause valve mechanisms in the body 20 to hydraulically control the position of the power piston 22. Signals supplied by the line 38 to the device 36 originate from an amplifier 40 which receives input signals from a line 42, connected with the force rod 14, and a line 44 connected with an altitude command unit 46. The altitude command unit 46 may contain a radar or barometric altimeter, or both, and may be set to a desired altitude. The altitude command unit develops an error signal related to the difference between the desired and the actual altitude. This error signal is then transmitted by the line 44 to the amplifier 40 to provide an amplified error signal which is transmitted by the line 38 to the electromechanical input device 36. The latter device then operates in response to the signal to cause the power piston 22 to be hydraulically driven in the proper direction to decrease the error and return the helicopter toward the desired altitude. As long as no movement is applied to the collective stick 10, the altitude command unit 46, amplifier 40 and electromechanical device 36 will operate in conjunction with the servo actuator 18 to automatically maintain the helicopter at the desired altitude.

During the above-described automatic operation, however, it is desirable that the pilot be capable of manually overriding the control system so as to be able to quickly change the altitude of the helicopter in the event of an unforseen disturbance or the like. In order to provide for this, the force rod 14 includes a means for developing an electric output signal related to the force applied between the ends of the rod. This output signal is transmitted by the line 42 to the amplifier 40 where it is summed with the signal supplied by the altitude command unit to provide a resultant signal which is supplied to the electromechanical device 36 to cause adjustment of the power piston 22. That is, assumed that the pilot suddenly desires to increase the altitude of the helicopter while the control system is operating in the automatic mode. To do this he pulls upwardly on the collective stick 10, the usual manner for increasing the lift of the helicopter rotor. This causes a tensile force to be exerted between the ends of the force rod 14 and in turn causes the transmission of an output signal of a given character to the amplifier 40 through the line 42. The character of the signal supplied by the line 42 is such that the resultant amplified signal delivered by the line 38 to the electromechanical valve 36 causes the valve 36 to move the power piston 22 in the proper direction to cause an increase in the lift of the rotor. Preferably, the output signal delivered by the line 42 is directly related to the force applied to the force rod so that the greater the force applied to the collective stick the greater will be the movement of the power piston 22.

It is also highly desirable, if not essential, that during automatic operation the force rod 14 be operable to supply no output signal to the amplifier 40 when little or no force is applied to the collective stick 10. Even a small output signal supplied to the amplifier by the line 42 when the pilot releases the collective stick 10 may cause a serious drift in the actual altitude of the helicopter away from the desired altitude. One of the features of this invention is, therefore, the construction of the force rod 14 whereby the rod produces no output signal for relatively small forces applied thereto, but for relatively larger forces provides an output signal directly related to the magnitude of the force. The structure of the force rod to obtain this desired operation is discussed in detail below.

Figure 3:
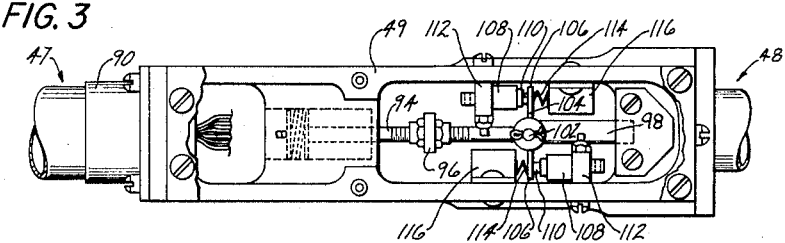
FIG. 3 is a bottom view showing the control unit housing of the force rod of FIG. 2 and the various parts of the electric control device contained in said housing, with various parts being broken away to show more clearly the structure of other parts.

*Construction of the force rod—FIGS. 2 and 3*

FIGS. 2 and 3 show in detail the construction of the force rod 14 employed in the system of FIG. 1. Referring to these figures it will be noted that the force rod 14 includes two members supported relative to each other for longitudinal relative sliding movement. Each of these members is indicated generally at 47 and 48, respectively. The member 47 is an assembly of parts comprising a housing 49 having a cylindrical portion 50 at its upper left-hand end, as viewed in FIG. 2, and to which portion is secured a tube 51. At its left-hand end, the tube 51 is necked to a smaller diameter, as best seen in FIG. 1, and provided with a rod end bearing 52 adapted for attachment to the collective stick 10. The member 48 is also an assembly of parts and includes a generally tubular adaptor 53 which threadably receives a rod end bearing 54 at its right-hand end for connection with the input lever 16 of the servo actuator 18. A stem 56 is fixed to the adaptor 53 and includes a portion which is received by the bore of the adaptor, being secured thereto by rivets 58, 58, and another portion which extends beyond the left-hand end surface 60 of the adaptor.

To slidably support the member 48 relative to the member 47, the housing 49 intermediate its ends includes a cylindrical bore 62 which slidably receives an enlarged cylindrical head 64 on the left-hand end of the stem 56. Also, at its right-hand end the housing 49 threadably receives a nut 66 having a cylindrical bore which slidably receives and engages the outer surface of the adaptor 53.

Cooperating with the relatively slidable members 47 and 48 is a spring means for resisting longitudinal sliding movement of one member relative to the other in either direction from a neutral position. In FIG. 2 the two members are shown in their relatively neutral positions. The spring means includes two retaining cups 68, 68 having cylindrical outer surfaces slidably received by an enlarged bore 70 formed in the housing 49 and between the bore 62 and the nut 66. The open ends of the two retaining cups face one another, as shown in FIG. 2, and receive a calibrated spring 72 which surrounds the stem 56 and tends to spread apart the two retaining cups. Leftward movement of the left-hand retaining cup 68 is limited by a radial shoulder 74 formed in the housing 49 between the bore 62 and the bore 70. Rightward movement of the right-hand cup 68 is limited by the end surface 76 of the nut 66. Also, the enlarged head 64 of the stem 56 has a radial shoulder 78 engageable with the left-hand cup 68 and the end surface 60 of the adaptor 53 is engageable with the right-hand cup member. The relative dimensions of the various parts are such that when the two members 47 and 48 are in the neutral positions shown, the left-hand retaining cup 68 simultaneously engages the radial shoulders 74 and 78 and the right-hand cup simultaneously engages the end surfaces 60 and 76. The spring 72, however, is preferably designed with such a length that it is held in a slightly compressed state when the retaining cups are in engagement with the surfaces 74 and 76, respectively, so that a certain preloading of the cups is obtained which must be overcome before any relative sliding movement of the two members 47 and 48 will occur. In the illustrated force rod the preload exerted by the spring, for example, is in the order of 18 to 50 pounds.

The adjacent end edges of the two cups 68, 68 are separated by a narrow lengitudinal gap 80 which defines the maximum relative longitudinal movement of the two members 47 and 48. In the illustrated rod the size of this gap is approximately 0.040 inch.

In order to understand the operation of the spring biasing means assume that a tensile force is applied between the rod end bearings 52 and 54 tending to pull apart the two members 47 and 48. This will cause the radial shoulder 78 of the enlarged head 64 to press aagainst the left-hand retaining cup 68 and, if the force applied is sufficient to overcome the preload of the spring, will move the cup to the right toward the right-hand retaining cup. On the other hand, if a compressive force is applied between the rod end bearings so as to cause the two members 47 and 48 to be pushed toward each other, the end surface 69 of the adaptor 53 will bear against the right-hand retaining cup 68 and move the same to the left towards the left-hand retaining cup, provided the applied force is sufficient to overcome the preload of the spring. As a consequence of this it will be noted that the enlarged head 64 is moved to the left with respect to the housing 44 when a compressive load greater than the spring preload is applied to the force rod and is moved to the right with respect to the housing 44 upon the application of a tensile force greater than the spring preload. The spring 72 is accurately calibrated so that a given amount of force applied to the rod will produce a known amount of movement of the enlarged head 64.

The movement of the enlarged head 64 relative to the housing 49 is transmitted to an electric control device or transducer for providing an electrical output signal from the force rod. The electric control device consists essentially of a displacement sensing device having a movable member moved in unison with the movement of the enlarged head 64 relative to the housing 49 and cooperating means for producing an electric output signal related to the position of the movable member. Associated with the displacement sensing means is another means, preferably in the form of a switch arrangement, for eliminating or removing the output signal from the output terminals of the displacement sensing means when the above-mentioned movable member is located within a predetermined dead band comprising a portion of its range of travel.

Preferably, and as illustrated, the displacement sensing means comprises a linear variable differential transformer consisting of a cylindrical winding unit 82 having a central bore which receives a movable iron core 84. The winding unit 82 is received by a cylindrical opening in the structure of the housing 49 and is fixed thereto by means of a spring 86 and a pin 88, the spring being compressed, as shown in FIG. 2, between the left-hand end face of the unit and the pin 88. As explained in more detail below, the winding unit 82 includes an input or primary winding adapted for energization by an alternating current source, and a secondary winding means including two separate windings arranged generally symmetrically with respect to the primary winding and connected in bucking relationship. Attached to the housing 49 is an electrical connector 90 adapted for cooperation with a corresponding connector on the line 42. Connected with the connector 90 are various electrical conductors which interconnect the connector with the winding unit 82 and the switch means.

The movable iron core 84 is fixed to the left-hand end of a longitudinally extending non-magnetic rod 94. The right-hand end of the rod 94 is in turn secured to the bottom end of a pin 96 carried by the enlarged head 64 of the stem 56. Movement of the head 64 is therefore transmitted by the pin 96 and the rod 94 to the movable core 84.

The switch means associated with the differential transformer for producing a dead band in its output signal characteristic includes a slide 98 fixed to the pin 96 and extending longitudinally to the right therefrom, as shown best in FIG. 2. The slide 98 has its left-hand end portion secured to the pin 96 and at its right-hand end portion is received by an opening 100 in the housing which guides it for longitudinal moment. By virtue of being fixed to the pin 96 the rod 98 moves in unison with the iron core 84 and the enlarged head 64. As viewed in FIG. 2, the rod 98 intermediate its ends has fixed thereto a downwardly extending pin 102 which pivotally supports a cross member 104. As shown best in FIG. 3, the cross member 104 includes two arms 106, 106 which extend transversely outwardly from either side of the path of movement of the slide member 100. Associated with the cross member are two switches, 108, 108, of the type commonly referred to as microswitches. Each of these switches includes an actuating member or button 110 which is movable between a normal position and an actuated position and which is spring biased toward the normal position. The two switches 108, 108, are each fixed relative to the housing 49 by suitable supporting means indicated generally at 112, 112 and are arranged so that their actuating members each operatively engages a respective one of the cross member arms 106, 106. The arrangement is further such that each actuating member 110, when held in its actuated or depressed position by the associated cross member arm, exerts a force on the cross member tending to rotate it in a given direction about the pivot axis provided by the pin 102. For example, as shown in FIG. 3, the upper switch 108 is arranged so that its actuating member 110 engages the left-hand side of its associated cross member arm while the lower switch 108 is arranged so that its actuating member 110 engages the right-hand face of its associated cross member arm. Thus, each of the actuating members 110, 110, due to their spring biases, will tend to rotate the cross member in a clockwise direction about the pin 102.

Cooperating with the cross member 104 is another biasing means which tends to rotate the cross member in the direction opposite from that in which the actuating members 110, 110 tend to rotate the same. This biasing means may take various different forms, but in the illustrated example comprises two separate helical compression springs 114, 114 each associated with a respective one of the switches 108, 108. Each spring 114 is arranged so as to engage a respective one of the cross member arms on the side opposite from the associated switch actuating member 110. That is, as shown in FIG. 3, the lower spring 114 engages the left-hand side of the lower cross member arm 106 and works in opposition to the spring bias of the associated actuating member 110, while the upper spring 114 engages the right-hand side of the upper cross member arm 106 and works in opposition to the spring bias of the associated actuating member 110. Each spring 114 is supported relative to the housing 49 by means of a spring retainer 116 having a bore 118, as shown in FIG. 2, which receives a portion of the spring. FIG. 3 shows the slide member 100 in a position corresponding to the neutral or no-load position of the enlarged head 64 relative to the housing 44, and in this position the cross member 104, due to the action of the springs 114, 114, holds both of the switch actuating members 110, 110 in their actuated positions, the springs 114, 114 being designed to have sufficient strength to overcome the spring biases of the actuating members.

Figure 4:
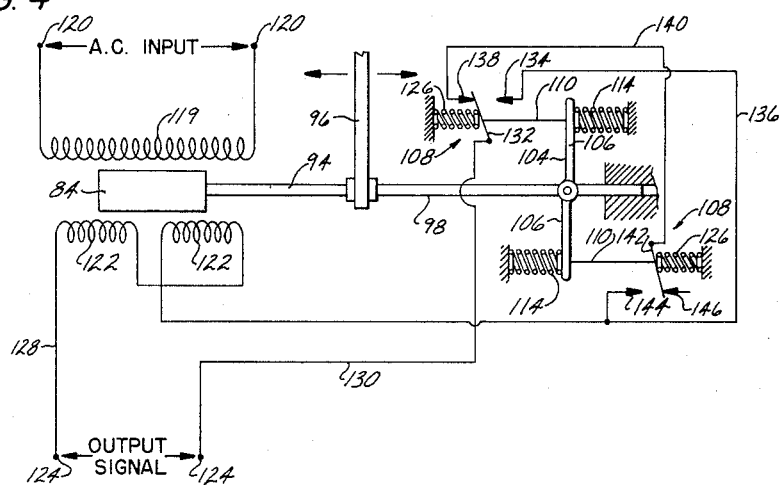
FIG. 4 is a schematic diagram illustrating the operation of the various parts of the control device contained in the housing of the force rod.
Figure 5:
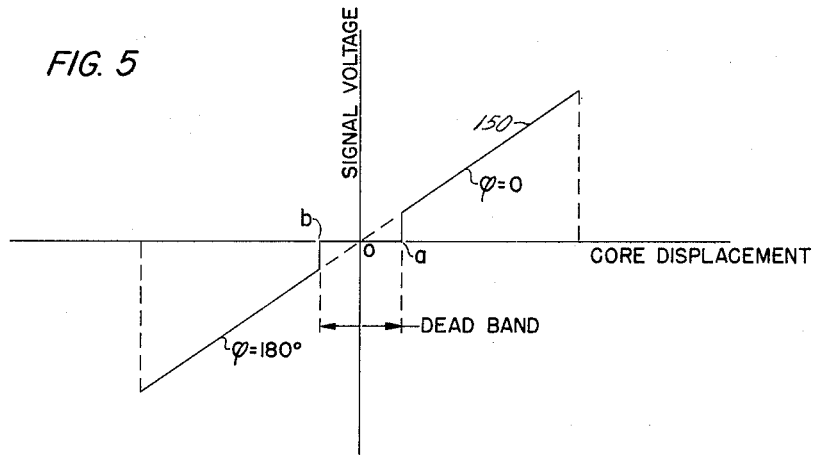
FIG. 5 is a graph illustrating the input vs. output signal characteristic of the force rod.

*Operation of the electric control device FIGS. 4 and 5*

The operation of the electric control device as described above in some detail in connection with FIGS. 2 and 3 may best be understood by reference to FIGS. 4 and 5. FIG. 4 shows schematically the arrangement and cooperation of the basic parts of the control device. Referring to this figure the parts of the differential transformer are shown at the left. The winding unit 82 of FIG. 2 includes a primary winding 119 having output terminals 120, 120 adapted for energization by an alternating current input. The winding unit also includes a secondary winding means inductively linked with the primary winding through the iron core 84 for producing an output signal related to the position of the iron core. As shown, this secondary winding means includes two separate windings 122, 122 arranged generally symmetrically with respect to the primary winding 118 and connected in series bucking relationship between two output terminals 124, 124. That is, the two windings 122, 122 are connected in series between the two terminals 124, 124 in such a manner that the voltage induced in one coil opposes that induced in the other.

When the iron core 84 is in a balanced or electrically null position, as shown in FIG. 4, the magnetic flux linkages between the primary winding and the two secondary windings are equal. The voltages induced in the two secondary windings therefore have equal magnitudes. Because of the bucking connection between these two windings, however, the voltages combine with each other 180° out of phase so that the net output signal voltage is zero. When the iron core is displaced from the illustrated balance position, the magnetic flux linkages which couple the primary to the two secondary windings become unequal. Depending on the direction in which the core is displaced, the voltage induced in one of the secondary windings will be greater or smaller than that induced in the other secondary winding. A net output voltage therefore appears at the secondary terminals, 124, 124. The amplitude of this voltage is at every instant proportionate to the core displacement, and is either in phase or in phase opposition with the voltage applied to the primary winding, depending on the direction in which the core is displaced from the balanced position. In other words, the amplitude of the output voltage is directly related to the displacement of the iron core from its null position while the phase of the output signal is related to the direction of the displacement.

The switch means associated with the differential transformer is operable to eliminate or remove the output signal from the output terminals 124, 124 when the iron core 84 is within a predetermined dead band comprising a portion of its range of travel. Preferably, this dead band comprises a region of movement including the null position of the iron core 84 and extending some distance to either side of the null position so that no output signal is produced in response to small movements of the iron core 84 in either direction from its null position. The elimination of the output signal from the terminals 124, 124 may be obtained by connecting the switch means either in circuit with the primary winding 118 for opening and closing an electrical circuit between the primary winding and its output terminals or in circuit with the secondary windings 122, 122 for opening and closing an electrical circuit between the secondary windings and their output terminals. In the illustrated case the switch means is shown to be connected in circuit with the secondary windings 122, 122 so as to control the delivery of the output signal developed in the secondary windings to the output terminals 124, 124. It will be understood, however, that substantially the same results may be obtained by connecting the switch means in circuit with primary winding 119 so as to control the energization of the primary winding.

In FIG. 4 the various parts are shown in the positions assumed when no load is applied to the force rod 14. The positions of the parts at this time may be referred to as their "neutral" positions. Preferably, and as illustrated, the position of the iron core 84 relative to the pin 96 is so adjusted that its electrically null position coincides exactly with its neutral position. If this condition exists no output signal will be derived from the differential transformer when no load is applied to the force rod, even if the primary winding is energized and the switches conditioned to provide a closed circuit between the secondary windings and the output terminals. Generally, however, this adjustment of the iron core is difficult to obtain and usually some small difference will exist between the null and neutral positions of the iron core with the result that a small net output voltage is induced in the secondary windings even when no load is applied to the force rod. The switching of this invention, however, prevents such an undesired signal from appearing at the output terminals and therefore avoids the necessity, if not the impossibility, of adjusting the iron core so that its null and neutral positions exactly coincide. In other words, the switching means allows for some error in this adjustment.

Referring to FIG. 4 it will be noted that under the neutral or no-load conditions illustrated, the cross member 104 holds both of the switch actuating members 110, 110 in their actuated positions against the action of their spring biasing means. In each case the biasing means of each switch is represented by a spring 126 which opposes the associated spring 114.

From FIG. 4 it will also be noted that one output terminal 124 is connected directly by means of a line 128 to one side of the secondary windings 122, 122. The other output terminal 124 is connected by means of a line 130 to the switch element 132 of the upper switch 108. The normally closed contact 134 of this switch is connected by means of a line 136 to the other side of the secondary windings 122, 122. The normally open contact 138 is connected by means of a line 140 to the switch element 142 of the lower switch 108. The normally closed contact 144 of this latter switch is connected through the line 136 to the other side of the secondary windings and the normally open contact 146 is unused. By tracing through this wiring diagram it will be noted that when the parts are in the neutral positions shown an open circuit exists between the output terminals 124, 124 and the secondary windings 122, 122. Therefore, any net signal voltage induced in the secondary windings is prevented from appearing at the output terminals.

Assume now, however, that the pin 96 and slide 98 are moved toward the right as a result of a tensile force applied between the ends of the force rod 14. As the slide 98 moves to the right, the lower end of the lower cross member arm 106 is prevented from partaking of this movement because of the engagement of the switch member 142 with the contact 146. The actuating member 110 therefore acts as a fulcrum for the cross member 104. The net result is that the upper end of the upper cross arm 105 moves to the right a rate greater than that of the slide 100. That is, the movement of the slide 100 results in an amplified moment of the upper end of the upper cross arm. The force exerted on the cross member by the slide 100 overcomes that exerted by the upper spring 114 and after a predetermined displacement of the slide 100 to the right the switch member 132 will be returned by its bias spring 126 to its normal position whereat it contacts the normally closed contact 134. When this switching occurs a closed circuit will be completed between the output terminals 124, 124 and the secondary windings 122, 122 and any output signal induced in the latter windings will appear at the output terminals. Likewise, if the pin 96 is moved to the left of the neutral position shown at FIG. 4, the upper switch actuating member 110 will act as a fulcrum for the cross member 114 and product an amplified movement to the left of the lower end of the lower cross member arm 106. After the pin 96 moves a predetermined distance to the left the switch element 142 of the lower switch 108 will be returned to its normally closed position at which it contacts the normally closed contact 144 to complete a circuit between the secondary windings and the output terminal.

The net effect of this is that an open circuit is provided between the output terminals and the secondary windings when the slide 100 and the iron core 84 are located at their neutral positions or within a predetermined distance to either side thereof. Movement beyond said predetermined distances in either direction from the neutral position causes a switching action which completes a circuit to connect the secondary windings to the output terminals.

If the iron core 84 is positioned relative to the pin 96 so that its electrical null position corresponds exactly with its neutral position the output signal vs. core displacement characteristic is such as shown in FIG. 5. In this figure, values along the horizontal coordinate axis represent displacements of the core from its electrical null position, with the null position being located at the intersection of the vertical and horizontal axes. When the core is at its null position the net output voltage induced in the secondary windings and appearing at the output terminals will be zero. As the core is displaced to the right the net voltage induced in the secondary windings follows the straight line characteristic indicated at 150, but due to the open circuit provided by the switches 108, 108 the output signal appearing at the output terminals will remain zero until the core is moved to the point $a$. At this point switching occurs and a circuit is completed between the output terminals and the secondary windings so that the secondary winding voltage signal appears at the output terminals. Thereafter further movement to the right causes the production of an output signal which follows the line 150 and is proportionately related to the displacement of the core from the null position. As indicated, the output voltage developed by rightward displacement of the core is in phase with the input voltage ($\phi=0$). If the core is displaced to the left from the null position no output voltage will be obtained at the output terminals until the core is displaced to and beyond the point $b$. At the point $b$ switching occurs and thereafter the signal appearing at the output terminals follows the line 150 and is proportionately related to the core displacement. As indicated, however, the signal produced upon leftward displacement of the core will be in phase opposition with the input voltage ($\phi=180°$).

The end result of this is a dead band between the points $a$ and $b$ at which no output signal is developed. As mentioned previously this is a desirable characteristic in control systems such as that shown in FIG. 1 insofar as it prevents drift and other undesirable conditions as a result of small loads applied to the collective stick 10 or as a result of a slight difference between the electrically null and neutral positions of the iron core 84. With reference to FIG. 5, a difference between the null and neutral positions of the iron core will cause a shifting of the dead band to the right or the left from the position shown while the line 150 representing the voltage induced in the secondary winding will remain unchanged. The dead band may therefore be shifted to the right by an amount approaching the distance $bo$ or to the left by an amount approaching the distance $oa$, and the output signal at the output terminals will remain zero when no load is applied to the force rod. The amount by which the dead band is shifted is equal to the difference between the null and neutral positions of the iron core and therefore the distances $bo$ and $oa$ represent the maximum permissible error in the adjustment of the iron core if a zero output signal is desired under no load conditions.

The invention claimed is:

1. An electric control device comprising a displacement sensing device having a movable member and means for producing an electric output signal related to the position of said movable member, an output terminal, switch means between said signal producing means and said output terminal, and means responsive to the movement of said movable member for operating said switch so that said switch is open to disconnect said output terminal from said sensing means when said movable member is located within a predetermined dead band comprising a portion of its range of travel and so that said switch is closed to connect said output terminal to said sensing means when said movable member is located outside of said deadband.

2. An electric control device comprising a displacement sensing device having a movable member and means for producing an electric output signal related to the displacement of said movable member in either direction from a null position at which no output signal is derived from said latter means, an output terminal, switch means between said signal producing means and said output terminal, and means responsive to the movement of said movable member for operating said switch so that said switch is open to disconnect said output terminal from said sensing means when said movable member is located within a predetermined deadband including said null position and so that said switch is closed to connect said output terminal to said sensing means when said movable member is located outside of said deadband.

3. An electric control device comprising: a transformer having a primary winding adapted for energization by an alternating current source, a secondary winding means having a pair of output terminals, and a movable core the position of which controls the output signal derived from said secondary winding and which output signal normally appears across said output terminals; and switch means responsive to the movement of said core relative to said windings for eliminating said output signal from said terminals when said core is located within a predetermined dead band comprising a portion of its range of travel.

4. An electric control device comprising: a transformer having a primary winding adapted for energization by an alternating current source, a secondary winding means having a pair of output terminals, and a movable core the position of which controls the output signal derived from said secondary winding and which output signal normally appears across said output terminals; and means for interrupting the electrical circuit between said secondary winding means and said output terminals when said core is located within a predetermined dead band comprising a portion of its range of travel so that no output signal is produced at said output terminals when said core is within said dead band.

5. An electric control device comprising: a differential transformer having a primary winding adapted for energization by an alternating current source, a pair of output terminals, a secondary winding means for producing an output signal at said output terminals, and a movable core the position of which controls the output signal derived from said secondary winding and which core has an electrically null position at which no output signal is derived from said secondary winding means when said primary winding means is energized; and switch means connected in circuit with one of said windings and operated by said movable core for removing said output signal from said output terminals when said core is located within a predetermined portion of its range of travel and which portion includes said electrically null position.

6. An electric control device as defined in claim 5 further characterized by said switch means being connected in circuit with said secondary winding and being arranged to provide an open circuit between said secondary winding means and said output terminals to remove said output signal from said output terminals when said core is located within said predetermined portion of its range of travel.

7. An electric control device comprising: a differential transformer having a primary winding adapted for energization by an alternating current source, a pair of output terminals, a secondary winding means for producing an output signal at said output terminals, and a movable core the position of which controls the output signal provided by said secondary winding means; switch means electrically connected in series with said secondary winding means for opening and closing an electrical circuit between said secondary winding means and said output terminals; and means connected with said core for controlling the operation of said switch means in accordance with the position of said core, said switch means and said means for controlling the operation thereof being so constructed and arranged as to cause the electrical circuit between said secondary winding means and said output terminals to be open when said core is positioned within a predetermined dead band comprising a portion of its range of travel and to be closed when said core is positioned outside of said dead band with the result that said secondary winding means is electrically disconnected from said output terminals and no output signal appears across said output terminals when said core is within said dead band.

8. An electric control device comprising: a differential transformer having a primary winding adapted for energization by an alternating current source, a pair of output terminals, a secondary winding means connected in circuit with said output terminals and adapted to provide an output signal at said terminals, and a movable core the position of which controls the output signal provided by said secondary winding means; and first and second switches operated by said core and electrically connected in circuit between said secondary winding means and said output terminals and arranged to provide an open circuit between said secondary winding means and said output terminals when said core is at a given neutral position, said first switch including parts operated by said core to close the circuit between secondary winding means and said output terminals when said core is displaced more than a predetermined distance in one direction from said neutral position, and said second switch including parts operated by said core to close the circuit between said secondary winding means and said output terminals when said core is displaced more than a predetermined distance in the opposite direction from said neutral position.

9. An electric control device as defined in claim 8 further characterized by said secondary winding means comprising two separate windings arranged generally symmetrically with respect to said primary winding and connected in series bucking relationship so that the voltages induced therein buck one another and at a given null position of said core exactly balance each other to produce a zero net output voltage, said switches being arranged so that said neutral position of said core substantially coincides with said null position.

10. An electric control device comprising: a differential transformer having a primary winding means connected in circuit with a pair of input terminals and adapted for energization by an alternating current source, a pair of output terminals, a secondary winding means connected in circuit with said output terminals for developing an output signal thereacross, and a longitudinally movable core the longitudinal position of which controls the output signal provided by said secondary winding means; a first member movable longitudinally in unison with said core and having pivotally secured thereto a cross member comprising two arms extending transversely outwardly from either side of the path of movement of said first member, two switches each having an actuating member movable between a normal position and an actuated position and spring biased toward said normal position, said switches being arranged so that their actuating members each operatively engages a respective one of said cross member arms and being further so arranged so that each actuating member when held in its actuated position by its associated cross member arm exerts a force on said cross member tending to rotate the same in a given direction about its pivot axis relative to said first member, and means for biasing said cross member in the opposite direction about its pivot axis relative to said first member and which biasing means exerts a sufficient moment on said cross member to cause said cross member to hold both of said switch actuating members in their actuated positions when said first member is located at a given neutral position along its longitudinal path of movement and with the result that when said first member is moved in one or the other longitudinal direction from said neutral position one or the other of said actuating members is held in its actuated position and acts as a fulcrum for said cross member to cause an amplified movement of the opposite cross member arm and its associated actuating member, said two switches being electrically connected in circuit between one of the winding means of said differential transformer and the associated pair of terminals and being operable to provide an open circuit between the latter winding means and the associated terminals when both said actuating members are in their actuated positions and to provide a closed circuit when either one of said actuating members is moved to its normal position.

11. An electric switch mechanism comprising a housing, a cross member having a pivot axis and two arms extending outwardly in opposite directions from said pivot axis, means for supporting said cross member for reciprocating movement of said pivot axis relative to said housing along a path generally normal to said cross member arms, two switches fixed relative to said housing and each having an actuating member movable between a normal position and an actuated position and spring-biased toward said normal position, said switches being arranged so that their actuating members each operatively engages a respective one of said cross member arms and being further so arranged that each actuating member when held in its actuated position by the associated cross member arm exerts a force on said cross member tending to rotate the same in a given direction about said pivot axis, and means for biasing said cross member in the opposite direction about its pivot axis and which biasing means exerts sufficient force on said cross member to cause the latter to hold both of said switch actuating members in their actuated positions when said cross member pivot axis is at a given neutral position along its path of reciprocating movement.

12. An electric switch mechanism comprising a housing, a first member movable longitudinally relatively to said housing and having pivotally secured thereto a cross member having two arms extending transversely outwardly from either side of the path of movement of said first member, two switches fixed relative to said housing and each having an actuating member movable between a normal position and an actuated position and spring-biased toward said normal position, said switches being arranged so that their actuating members each operatively engages a respective one of said cross member arms and being further so arranged so that each actuating member when held in its actuated position by the associated cross member arm exerts a force on said cross member tending to rotate said cross member in a given direction about its pivot axis relative to said first member, and means for biasing said cross member in the opposite direction about its pivot axis relative to said first member and which biasing means exerts sufficient force on said cross member to cause the latter to hold both of said switch actuating members in their actuated positions when said first member is at a given neutral position relative to said housing and with the result that when said first member is moved in one or the other longitudinal direction from said neutral position one or the other of said actuating members is held in its actuated position and acts as a fulcrum for said cross member to cause an amplified movement of the opposite cross member arm and its associated actuating member.

13. An electric switch mechanism as defined in claim 12 further characterized by said biasing means comprising two springs associated respectively with said two switches and each of which springs is arranged to urge the associated cross member arm against the associated switch actuating member.

14. A force rod comprising two members supported relative to each other for relative longitudinal movement, spring means associated with said two members for resisting longitudinal movement of one member relative to the other in either direction from a neutral position, a differential transformer including primary and secondary winding means fixed relative to said one member and a core movable relative to said winding means to vary the inductive coupling therebetween, said core being fixed relative to said other member so that relative longitudinal movement of said two members results in a corresponding movement of said core relative to said winding means, said differential transformer including a pair of input terminals connected with said primary winding means and a pair of output terminals connected with said secondary winding means so that said output and input terminals are electrically connected by a circuit including the inductive coupling between said primary and secondary winding means, and switch means in said circuit for opening said circuit to prevent the appearance of an output signal at said output terminals when said two members are in said neutral position.

15. A force rod comprising two members supported relative to each other for relative longitudinal movement, spring means associated with said two members for resisting longitudinal movement of one member relative to the other in either direction from a neutral position, a differential transformer including primary and secondary winding means fixed relative to said one member and a core movable relative to said winding means to vary the inductive coupling therebetween said core being fixed relative to said other member so that relative longitudinal movement of said two members results in a corresponding movement of said core relative to said winding means, said differential transformer including a pair of input terminals connected with said primary winding means and a pair of output terminals connected with said secondary winding means so that said output and input terminals are electrically connected by a circuit including the inductive coupling between said primary and secondary winding means, and switch means connected in circuit between one of said winding means and the associated pair of terminals and operable to provide an open circuit between said latter winding means and said latter terminals when said one member is in said neutral position relative to said other member.

16. A force rod comprising two members supported relative to each other for relative longitudinal movement, spring means associated with said two members for resisting longitudinal movement of one member relative to the other in either direction from a neutral position, a differential transformer including a winding unit fixed relative to one of said members and a movable core fixed relative to the other of said members so that relative longitudinal movement of said two members results in a corresponding movement of said core relative to said winding unit, said winding unit including a primary winding means having associated therewith a pair of input terminals and a secondary winding means having associated therewith a pair of output terminals, said secondary winding means including two separate windings arranged generally symmetrically with respect to said primary winding and connected in series bucking relationship so that the voltages induced therein buck one another and at a given null position of said core exactly balance each other to produce a zero net output voltage, and switch means connected in circuit between one of said winding means and the associated pair of terminals and operable to provide an open circuit between said latter winding means and said latter terminals when said one member is within a predetermined dead band comprising a portion of its range of longitudinal movement relative to the other member, said dead band including said neutral position of said one member and the position of said one member corresponding to said null position of said core.

17. A force rod comprising two members supported relative to each other for relative longitudinal movement, spring means associated with said two members for resisting longitudinal movement of one member relative to the other in either direction from a neutral position, a differential transformer including a winding unit fixed relative to one of said members and a movable core fixed relative to the other of said members so that relative longitudinal movement of said two members results in a corresponding movement of said core relative to said winding unit, said winding unit including a primary winding means having associated therewith a pair of input terminals and a secondary winding means having associated therewith a pair of output terminals, two switches electrically connected in the circuit between one of said winding means and the associated pair of terminals and adapted to provide an open circuit between said latter winding means and said latter terminals when said one member is in said neutral position relative to said other member, and means for operating said switches in response to movement of said one member relative to the other member, said operating means being effective to operate one or the other of said two switches to close the circuit between said latter winding means and said latter terminals when said one member is displaced more than a predetermined distance in one direction or the other, respectively, from said neutral position.

18. A force rod as defined in claim 17 further characterized by said switch operating means including means for amplifying the movement of said one member relative to said other member.

19. A force rod comprising two members supported relative to each other for relative longitudinal movement, spring means associated with said two members for resisting longitudinal movement of one member relative to the other in either direction from a neutral position, a differential transformer including a winding unit fixed relative to one of said members and a movable core fixed relative to the other of said members so that relative longitudinal movement of said two members results in a corresponding movement of said core relative to said winding unit, said winding unit including a primary winding means having associated therewith a pair of input terminals and a secondary winding means having associated therewith a pair of output terminals, a slide fixed relative to one of said members for movement therewith and having pivotally secured thereto a cross member comprising two arms extending transversely outwardly from either side of the path of movement of said slide, two switches fixed relative to the member other than that relative to which said slide is fixed and each having an actuating member movable between a normal position and an actuated position and spring-biased toward said normal position, said switches being arranged so that their actuating members each operatively engages a respective one of said cross member arms and being further so arranged so that each actuating member when held in its actuated position by its associated cross member arm exerts a force on said cross member tending to rotate the same in a given direction about its pivot axis relative to said first member, and means for biasing said cross member in the opposite direction about its pivot axis relative to said first member and which biasing means exerts a sufficient force on said cross member to cause said cross member to hold both of said switch actuating members in their actuated positions when said one member is in said neutral position with respect to said other member and with the result that when said one member is moved in one or the other longitudinal direction from said neutral position one or the other of said actuating members is held in its actuated position and acts as a fulcrum for said cross member to cause an amplified movement of the opposite cross member arm and its associated actuating member, said two switches being electrically connected in circuit between one of said winding means and the associated pair of terminals and being operable to provide an open circuit between the latter winding means and the associated terminals when both said actuating members are in their actuated positions and to provide a closed circuit when either one of the said actuating members is moved to its normal position.

References Cited by the Examiner

UNITED STATES PATENTS

| | | | |
|---|---|---|---|
| 2,289,882 | 7/42 | Myers | 200—153 |
| 2,306,000 | 12/42 | Stilphen | 323—51 X |
| 2,325,548 | 7/43 | Roos et al. | 244—87 |
| 2,466,028 | 4/49 | Klemperer | 323—51 |
| 2,512,902 | 6/50 | Rossire | 336—20 |
| 2,636,386 | 4/53 | Schultheis | 336—30 X |
| 2,708,730 | 5/55 | Alexander et al. | 323—51 X |
| 2,770,768 | 11/56 | Exner | 323—51 |
| 2,785,256 | 3/57 | Nina | 200—153 |
| 2,820,117 | 1/58 | Waite | 200—153 X |
| 2,861,756 | 11/58 | Feucht et al. | 336—30 |
| 2,997,565 | 8/61 | Frachon | 200—153 |
| 3,021,097 | 2/62 | Hecht | 244—77 |
| 3,089,081 | 5/63 | Brosh | 323—51 |

LLOYD McCOLLUM, *Primary Examiner.*

MAX L. LEVY, *Examiner.*